United States Patent
Lee et al.

(10) Patent No.: US 7,110,603 B2
(45) Date of Patent: Sep. 19, 2006

(54) FAST INVARIANT MATCHING USING TEMPLATE DECOMPOSITION AND SYNTHESIS

(76) Inventors: Shih-Jong J. Lee, 15418 SE. 53rd Pl., Bellevue, WA (US) 98006; Seho Oh, 5025 145th Pl. SE., Bellevue, WA (US) 98006

(*) Notice: Subject to any disclaimer, the term of this patent is extended or adjusted under 35 U.S.C. 154(b) by 736 days.

(21) Appl. No.: 10/419,913

(22) Filed: Apr. 16, 2003

(65) Prior Publication Data
US 2004/0208374 A1    Oct. 21, 2004

(51) Int. Cl.
G06K 9/62   (2006.01)
G06K 9/00   (2006.01)
G06K 9/46   (2006.01)

(52) U.S. Cl. .................... 382/209; 382/181

(58) Field of Classification Search ........... 382/209, 382/291, 195, 296, 217, 218, 117, 224, 135, 382/219, 159, 190, 165, 151, 287, 278, 181; 706/20, 25, 27; 707/3; 358/1.9
See application file for complete search history.

(56) References Cited

U.S. PATENT DOCUMENTS

| | | | | |
|---|---|---|---|---|
| 4,567,610 A | * | 1/1986 | McConnell | 382/170 |
| 4,972,499 A | * | 11/1990 | Kurosawa | 382/227 |
| 5,982,912 A | * | 11/1999 | Fukui et al. | 382/118 |
| 6,088,483 A | * | 7/2000 | Nakano et al. | 382/209 |
| 6,272,247 B1 | * | 8/2001 | Manickam et al. | 382/217 |
| 6,798,925 B1 | * | 9/2004 | Wagman | 382/287 |
| 6,944,331 B1 | * | 9/2005 | Schmidt et al. | 382/165 |
| 7,039,229 B1 | * | 5/2006 | Lin et al. | 382/165 |

OTHER PUBLICATIONS

Ballard DH and Brown CM, "Computer Vision", Prentice-Hall Inc., 1982, pp. 68-70.
Lee, JSJ, Haralick, RM and Shapiro, LG, "Morphologic Edge Detection," IEEE Trans. Robotics and Automation RA3(2):142-56, 1987.
Silver, B, "Geometric Pattern Matching for General-Purpose Inspection in Industrial Machine Vision", Intelligent Vision '99 Conference, Jun. 28-29, 1999.

* cited by examiner

*Primary Examiner*—Sheela Chawan

(57) ABSTRACT

A fast matching method performs pattern decomposition and synthesis learning to create a pattern search recipe that is used by an invariant pattern search and synthesis method to generate the match result. The pattern search recipe includes template component invariant profiles, component weights, and allowable partial pattern configurations. The invariant matching method supports partial pattern match. This invention decomposes a template into multiple compact shaped components and performs search using separate rotation and scale invariant profiles for each component. It then synthesizes the search results for the complete template or partial template using the component search results.

6 Claims, 8 Drawing Sheets

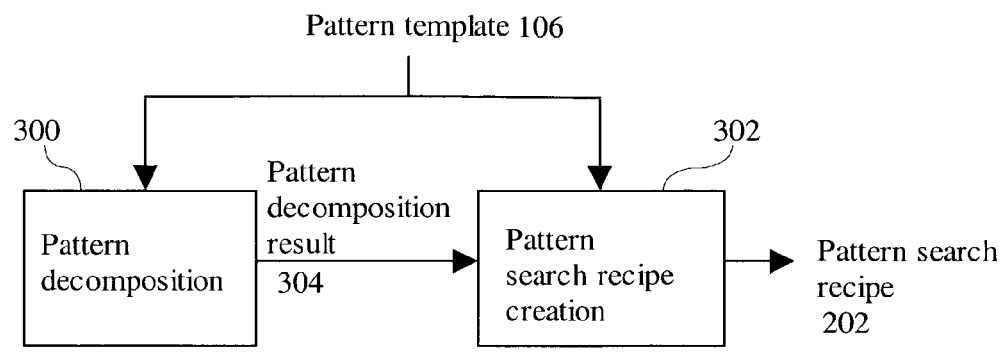
Figure 3
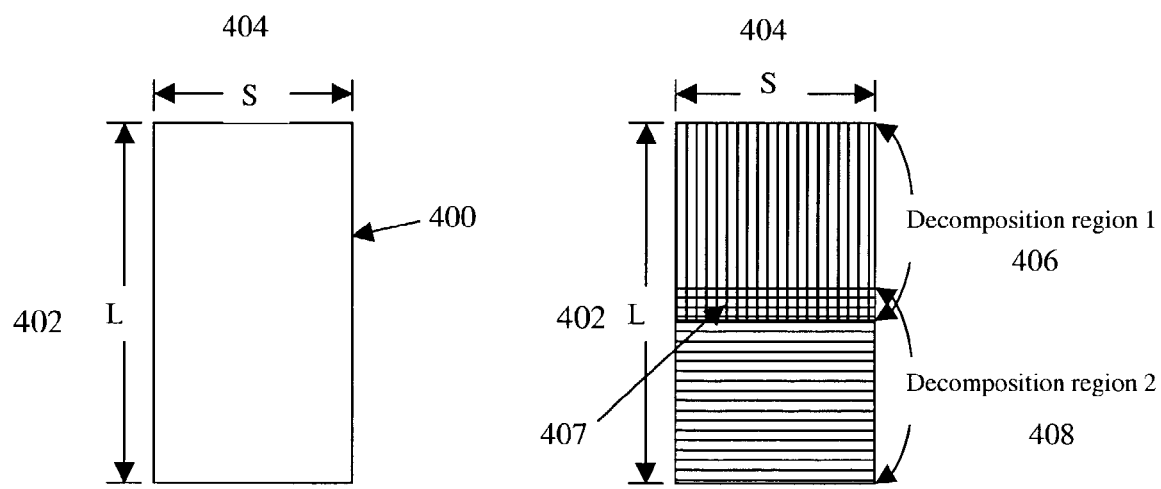
Figure 4A
Figure 4B

FAST INVARIANT MATCHING USING TEMPLATE DECOMPOSITION AND SYNTHESIS

TECHNICAL FIELD

This invention relates to a method for fast invariant matching using template decomposition and synthesis.

BACKGROUND OF THE INVENTION

Pattern search is a simple yet powerful machine vision tool. Given a template pattern and an image, its objective is to find all instances of the pattern in the image. It involves two steps, a search step and a match step. The search step places the pattern at all valid poses (locations, rotation angles), and scales of the image being searched. The match step determines the goodness of the match between the pattern at a given pose and scale and the subset of the image corresponding to the pose and scale. The normalized correlation method (Ballard DH and Brown CM, "Computer Vision", Prentice Hall 1982, pp. 68–70) of fixed rotation and scale has been widely used as the matching method in many machine vision applications. The match score of normalized correlation is largely independent of linear variations in object shading caused by reflectivity or illumination variations. However, pattern search based on a normalized correlation method is inherently computationally demanding since it requires operations between two (pattern and image) two-dimensional regions on all valid image locations. Even with the state-of-the-art computers, it is still difficult to achieve real-time performance when the image or pattern size is large. Furthermore, it does not work well when the pattern being searched is subject to rotation and/or size/aspect ratio variations. The match score could drop significantly even if only a few degrees of rotation or a few percent of size change occurs. One prior art approach to rotation and scale invariance is to rotate and scale the pattern template and try all possible scale and rotation combinations. However, this imposes an even greater computational demand that cannot be accomplished using normalized correlation.

Another prior art approach is the use of a geometric pattern matching method such as PatMax introduced by Cognex (Silver B, "Geometric Pattern Matching for General-Purpose Inspection in Industrial Machine Vision", Intelligent Vision '99 Conference, Jun. 28–29, 1999). This approach uses geometric information in place of pixel grid-based correlation. For example, it interprets a square as four line segments and a football as two arcs. It extracts key geometric features within an object image such as boundary encoding and measures characteristics such as shape, dimensions, angle, arcs, and shading. It then corresponds the spatial relationships between the key features of the pattern template and the new image. However, this prior art approach requires high edge contrast and low noise between patterns and background to reliably extract the key geometric features. It fails when edges of a pattern are not well defined. This is the inherent problem when using the geometric approach in place of any pixel grid based approach.

A rotation and scale invariant pattern matching method was disclosed (Shih-Jong J. Lee et. al., "A Rotation and Scale Invariant Pattern Matching Method", U.S. patent application Ser. No. 09/895,150 filed Apr. 10, 2002) that generates a polar coordinate representation of the pattern template image thereby allowing for fast linear search of scale along the radius axis and a search for rotation angle along the angular axis. Fast search is achieved by projecting image intensities into the radius axis for scale search and projecting image intensities into the angular axis for rotation angle search. However, this method requires that the polar coordinate transformation be performed on each image region where the rotation and scale invariant pattern matching method is applied. This is especially time consuming if image regions centered at all positions of an image are subjected to the search. It is desirable to have a fast initial invariant search method that quickly identifies a reduced set of image positions where the finer rotation and scale invariant pattern matching method could be applied.

Furthermore, the speed of prior art invariant search methods depends on the range of rotation angles that need to be searched. It is time consuming when the rotation angle search range is large. It is desirable to have an invariant search method that does not depend on the rotation angle search range.

A fast regular shaped pattern search method was disclosed (Lee, Shih-Jong J. et. al., "Fast Regular Shaped Pattern Searching", U.S. patent application Ser. No. 10/255,016 filed on Sep. 24, 2002) that performs fast pattern matching with flexible projection kernels to construct regular-shaped patterns using an accumulation method. Other prior art methods were disclosed (Lee, Shih-Jong J., Oh, S, Kim, D. "Fast Pattern Searching," U.S. patent application Ser. No. 10/283,380, filed on October, 2002; Lee, Shih-Jong J, Oh, S "Fast Invariant Pattern Search", U.S. patent application Ser. No. 10/302,466, filed on November, 2002) that teach a fast invariant search method for initial detection of the match candidates using rotation and scale invariant profiles. The rotation invariant contours of the invention achieve fast rotation invariant search that is independent of the rotation angle search range. However, the circular shaped rotation invariant contours do not fit well on pattern templates, which are not compact shaped such as elongated shape. To avoid covering regions outside the template, only a small compact region inside the template could be used. This could result in a large number of false or missed matches. Furthermore, the prior art approach is not designed for partial pattern matching so it may not achieve reliable results when the object of interest is partially occluded or has missing parts. It is highly desirable to have a new method that preserves a favorable speed advantage yet could handle non-compact templates and could support reliable partial pattern search.

OBJECTS AND ADVANTAGES

The primary object of the invention is to achieve high-speed invariant search. The second objective of the invention is to handle templates of arbitrary shapes. A further object of the invention is to improve the accuracy of the pattern search result. A still further object of the invention is to support reliable partial pattern search. Another object of the invention is to reduce false and missed matches. A further object of the invention is to allow the software implementation of the fast invariant search method in a general computer platform without special hardware to reduce cost and system complexity.

This invention decomposes a template into multiple compact shaped components and performs search using separate rotation and scale invariant profiles for each component. It then synthesizes the search result for the complete template or partial template using the component search results. The invention can be directly generalized to three-dimensional or higher dimensional invariant pattern search and can achieve even greater speed and accuracy advantage over the prior art methods. Therefore, it can be used (without limitation) in applications such as 3D medical imaging, dynamic medical imaging, confocal microscopy, live cell assays in drug discovery, or ultrasound imaging.

SUMMARY OF THE INVENTION

A fast decomposition and synthesis invariant matching method receives an input image and a pattern template. A fast decomposition and synthesis invariant pattern search method uses the input image and pattern template image to create a match result output. A refined invariant match uses the initial match result and the pattern template to create a refined invariant match result. The fast decomposition and synthesis invariant pattern search method performs pattern decomposition and synthesis learning to create a pattern search recipe that is used by an invariant pattern search and synthesis method to generate the match result. The pattern search recipe includes template component invariant profiles, component weights, and allowable partial pattern configurations. The invariant matching method supports partial pattern match.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which:

FIG. 3 shows the processing flow for the pattern decomposition and synthesis learning method;

FIG. 4A shows an example template pattern boundary box;

FIG. 4B shows two square decomposition regions of the example template pattern shown in FIG. 4A;

DETAILED DESCRIPTION OF THE INVENTION

I. Application Scenarios

Figure 1:
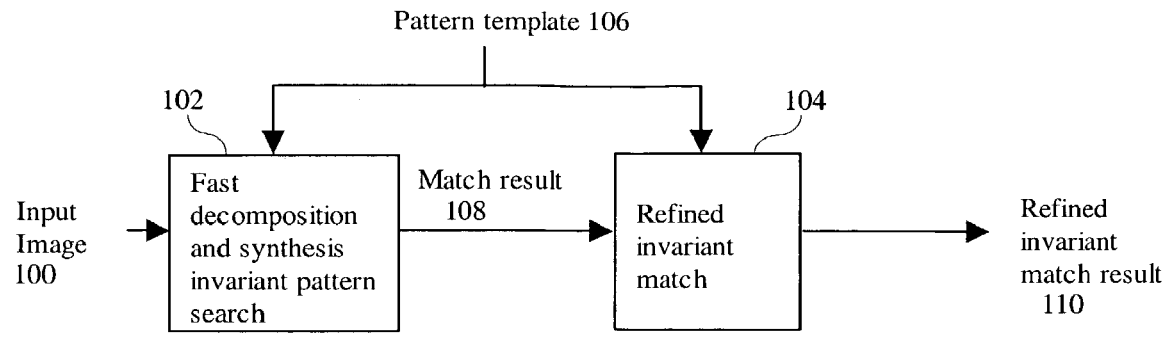
FIG. 1 shows an application method for fast invariant matching.

The application scenario of this invention is shown in FIG. 1. The input image 100 and a pattern template 106 is received by the fast decomposition and synthesis invariant pattern search method 102 of this invention, which generates a match result 108. The match result points to the match candidates that should include true matches and some false matches. The refined invariant match step 104 receives the pattern template 106, which is applied only to the match result 108 to perform refined search and thereby reject the false matches and confirm true matches. The output is a refined invariant match result 110. In one embodiment of the invention, the rotation and scale invariant pattern matching method (Shih-Jong J. Lee et. al., "A Rotation and Scale Invariant Pattern Matching Method", U.S. patent application Ser. No. 09/895,150 filed Apr. 10, 2002), which is incorporated in its entirety herein is used for refined invariant match 104. Those skilled in the art should recognize that other methods such as geometric pattern matching could be used for refined invariant match.

II. Fast Decomposition and Synthesis Invariant Pattern Search

Figure 2:
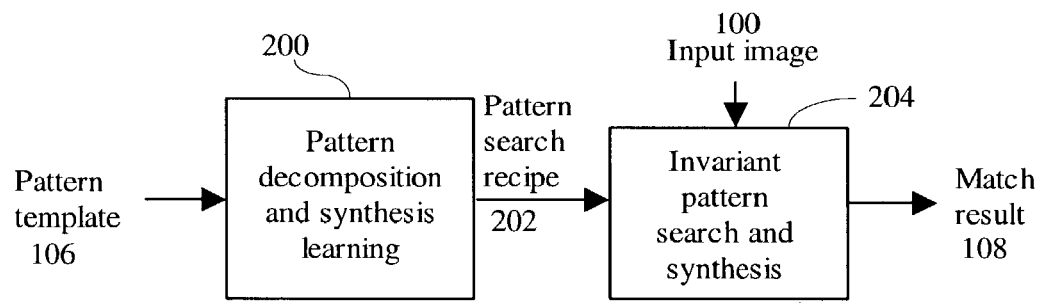
FIG. 2 shows the processing flow for the fast decomposition and synthesis invariant pattern search method.

The fast decomposition and synthesis invariant pattern search method of this invention consists of a learning phase and an application phase. The processing flow for the fast decomposition and synthesis invariant pattern search method is shown in FIG. 2.

The pattern decomposition and synthesis learning method 200 inputs the pattern template 106 and performs template decomposition followed by pattern search recipe creation. The pattern search recipe 202 includes a template invariant profile for each decomposition component as well as the invariant profile generation rules for the input image 100. It could also include the decomposition component weights and allowable partial pattern configurations for search result synthesis. The pattern search recipe 202 is used by the invariant pattern search and synthesis method 204 to perform invariant pattern search on at least one input image 100. This results in a match result 108 output.

II.1 Pattern Decomposition and Synthesis Learning

As shown in FIG. 3, Pattern decomposition and synthesis learning includes a pattern decomposition step 300 followed by a pattern search recipe creation step 302.

The pattern decomposition step 300 decomposes the pattern template 106 into a plurality of components. The pattern decomposition result 304 is used by the pattern search recipe creation step 302 to create the pattern search recipe 202.

II.1.1 Pattern Decomposition

Pattern decomposition divides the pattern template into multiple compact components for separate pattern search and integrated synthesis. This facilitates robust search results and partial pattern search. The pattern decomposition is rather flexible. The decomposed pattern components do not have to cover the entire area of the original pattern.

Furthermore, the decomposed pattern components do not have to be mutually exclusive. Therefore, the pattern decomposition result is non-unique and many pattern decomposition methods could be used.

In one embodiment of the invention, approximately square regions are formed for pattern component decomposition by the rules illustrated in FIG. 4A and FIG. 4B. Let the longer side of the pattern template boundary box 400 be L 402 and the shorter side of the pattern template boundary box 400 be S 404. Create N=Roundup(L/S−0.2) number of square regions of size S×S. Where Roundup(a) function results in the smallest integer value that is greater than or equal to a. If (S*N−L) is a positive value, each decomposition region is overlapped with its adjacent region by a (S*N−L)/(N−1)*S sub-region. If (S*N−L) is a negative value, the two adjacent regions will not be overlapped and will be separate by a |S*N−L|/(N−1)*S sub-region. FIG. 4A shows a pattern template region example and FIG. 4B shows its two decomposition regions: decomposition region 1 406 is highlighted by vertical lines and decomposition region 2 408 is highlighted by horizontal lines. The overlapped region 407 is highlighted by both vertical and horizontal lines. The pattern template within each decomposition region forms a decomposition component of the pattern template.

In another embodiment of the invention, each decomposition square region is further divided into smaller square regions such as 2×2 or 3×3 and only a subset of all decomposition regions are selected for decomposition components.

In yet another embodiment of the invention, the template pattern is processed by signal content enhancement. The signal content enhanced image is then subject to a spatial clustering to isolate the template regions having high signal content. The high signal content regions are used as decomposition regions to form the decomposition components. In one embodiment of the invention, image edge enhancement such as the method disclosed in Lee, J S J, Haralick, R M and Shapiro, L G, "Morphologic Edge Detection," IEEE Trans. Robotics and Automation RA3(2): 142–56, 1987 is used for signal content enhancement and structure-guided iterative morphological closing and opening such as the method disclosed in Lee, S J, "Structure-guided image processing and image feature enhancement" U.S. Pat. No. 6,463,175, Oct. 8, 2002 is used for spatial clustering.

An alternative embodiment of the invention selects only a few regions in the template to form the decomposition components. One region location selection criterion calls for large distance between decomposition component region locations. Another region location selection criterion calls for a big difference between invariant profiles. Based on these two criteria, the decomposition component locations could be selected to maximize the following cost function:

$$\text{cost} = A *\text{cost}_m + B *\text{cost}_p$$

Where A and B are weighting factors and $\text{cost}_m$ and $\text{cost}_p$ are the cost of the distance metric and cost of the profile differences. In one embodiment of the invention, the cost of the distance metric can be computed as $$\text{cost}_m \sum_{i \ne j} d_{ij}^2$$

and the cost of the profile differences can be computed as $$\text{cost}_p = \sum_{i \ne j} \int [\text{profile}_i(x) - \text{profile}_j(x)]^2$$

Where $\text{profile}_i$ and $\text{profile}_j$ are the invariant profiles of the template decomposition components i and j to be described in section II.1.2.1.

Those having ordinary skill in the art should recognize that other pattern decomposition methods such as by human selection or structure decomposition as disclosed in Lee, Shih-Jong J, Oh, Seho, "Structure-guided Image Inspection Method", U.S. patent application Ser. No. 10/247,723, filed Sep. 16, 2002, which is incorporated in its entirety herein, could be used and they are all within the scope of this invention.

II.1.2 Pattern Search Recipe Creation

Figure 5:
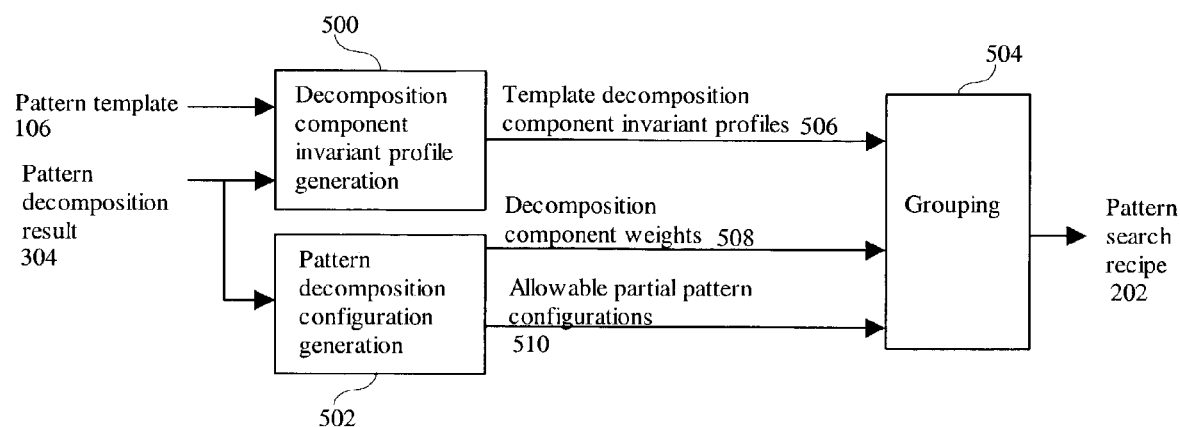
FIG. 5 shows the processing flow for the pattern search recipe creation method.

The pattern search recipe includes a template invariant profile for each decomposed component as well as the invariant profile generation rules for the input image. It could also include the allowable partial pattern configurations for search result synthesis and weighting factors for each decomposition component. The processing flow for the pattern search recipe creation method is shown in FIG. 5.

A decomposition component invariant profile generation method 500 inputs pattern template 106 and pattern decomposition result 304 to generate template decomposition component invariant profiles 506. A pattern decomposition configuration generation step 502 inputs pattern decomposition result 304 and generates decomposition component weights 508 and allowable partial pattern configurations 510. The template decomposition component invariant profiles 506 and the decomposition component weights 508 as well as the allowable partial pattern configurations 510 are grouped 504 into the pattern search recipe 202.

II.1.2.1 Decomposition Component Invariant Profile Generation

Rotation invariant profile can be generated for an image region by projecting the region into circular contours. The projection operation accumulates the image pixel values along each equal radius contour region. The accumulation results are the projection profile of the region. The projection profile can be normalized to remove the unequal area effect of different contours. This is illustrated in FIG. 6A through FIG. 6E.

Figures 6A, 6B:
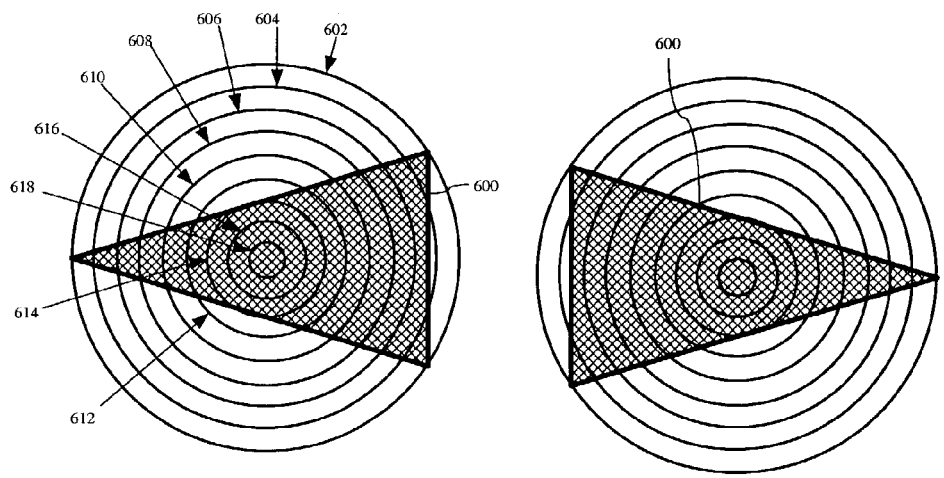
FIG. 6A shows an illustration of the circular profile projection for a triangle of one orientation having the normalized projection profile shown in FIG. 6E.
FIG. 6B shows an illustration of the circular profile projection for the same triangle of FIG. 6A but with a different orientation, having the same normalized projection profile shown in FIG. 6E.
Figure 6C:
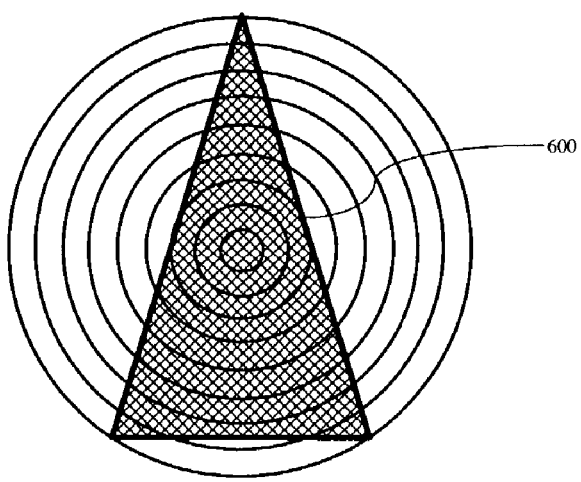
FIG. 6C shows an illustration of the circular profile projection for the same triangle of FIG. 6A, and FIG. 6B but with a different orientation, having the same normalized profile shown in FIG. 6E.
Figure 6D:
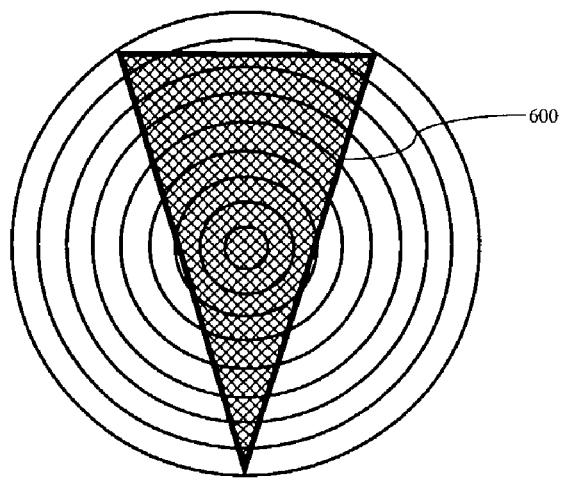
FIG. 6D shows an illustration of the circular profile projection for the same triangle of FIG. 6A, FIG. 6B, and FIG. 6C but with a different orientation, having the same normalized projection profile shown in FIG. 6E.

Refer to FIG. 6A. A rotation invariant profile can be generated for an image region by projecting the region into circular contours 602, 604, 606, 608, 610, 612, 614, 616, 618. The projection operation accumulates the image pixel values along each contour region corresponding to a radius. In FIG. 6A an example image of a triangle 600 is superimposed on the contour regions. Accumulation of the triangle image pixel values along each radius contour is the simple sum of all pixels within the contour that fall under the triangle. The accumulation result for each region plotted as a function of radius bin is the projection profile of the region. The projection profile is normalized to remove the unequal area effect of different radius contours (FIG. 6E).

Figure 6E:
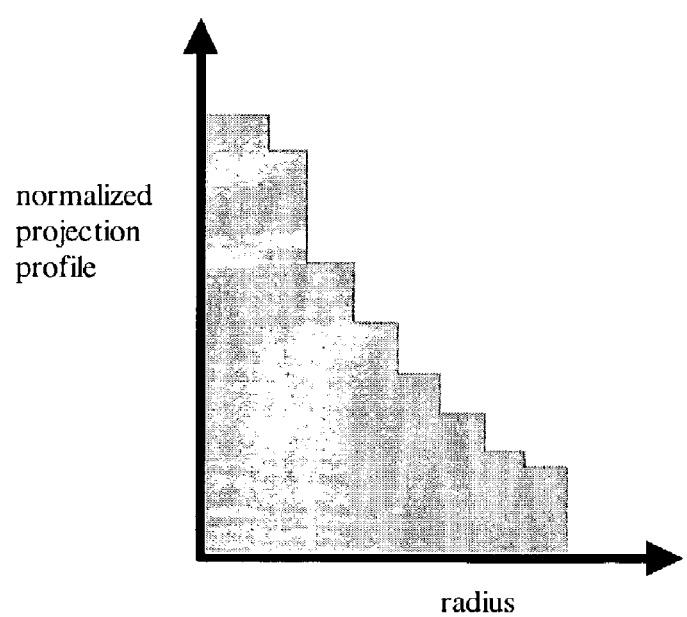
FIG. 6E shows the normalized projection profile for the triangle common to FIGS. 6A, 6B, 6C, and 6D.

As illustrated in FIGS. 6A, 6B, 6C, 6D, a triangle 600 of four different orientations has the same normalized projection profile, which is shown in FIG. 6E. The values in the bins of the normalized projection profile are the sum of pixel intensities divided by the number of pixels contained in the corresponding circular contour regions of different radii. In this illustration, the pixels within the shaded triangle 600 have equal high intensity values and those external to the triangle are zero.

As disclosed in, U.S. patent application Ser. No. 10/302, 466, entitled "Fast Invariant Pattern Search" filed on November, 2002 by Shih-Jong J. Lee and Seho Oh, the circular contours can be approximated by regular-shaped patterns such as octagon or multiple octagons. The regular-shaped patterns can be constructed using an accumulation method as disclosed in U.S. patent application Ser. No. 10/255,016, entitled "Fast Regular Shaped Pattern Searching", filed on September, 2002 by Shih-Jong J. Lee et. al. both of which are incorporated in their entirety herein. As detailed in the patent applications, an octagon pattern can be constructed by first applying an accumulation transformation to create the accumulation image. The accumulation image is processed by an octagon kernel construction step to output an octagon pattern result image. The octagon pattern result is an image with its pixel values corresponding to the sum of an octagon region of the input image centered at the pixel locations.

Figure 7:
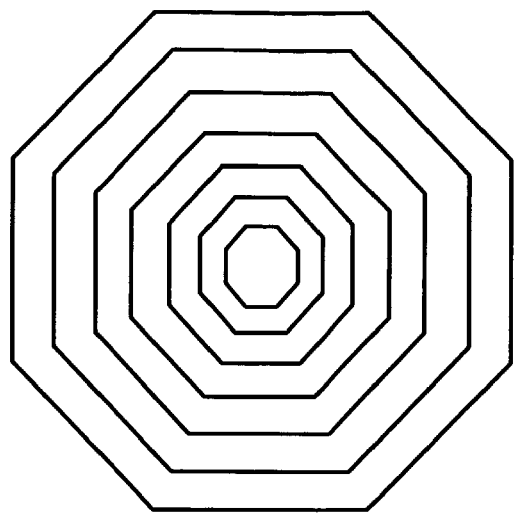
FIG. 7 shows an octagon contour set.

An octagon can be constructed by an algebraic sum of basic shapes (parallelograms). The basic shapes can be constructed using an accumulation image as detailed in the Fast Regular Shaped Pattern Searching (U.S. patent application Ser. No. 10/255,016, filed on September, 2002). As described, a pattern contour set is a set of same orientation pattern contours with increasing size. FIG. 7 shows an octagon contour set example of a pattern contour set. It is an approximation to the circular contour set that could be implemented efficiently.

The matching profiles of an octagon contour set can be constructed from same orientation octagons of different sizes. Note that same orientation octagons of different sizes can be constructed from the same accumulation images. Therefore, they can be created efficiently.

Those skilled in the art should recognize that other patterns could be used to approximate circular contours such as hexagon or complicated regular shapes having more than 8 sides as well as irregular shapes.

Figure 8:
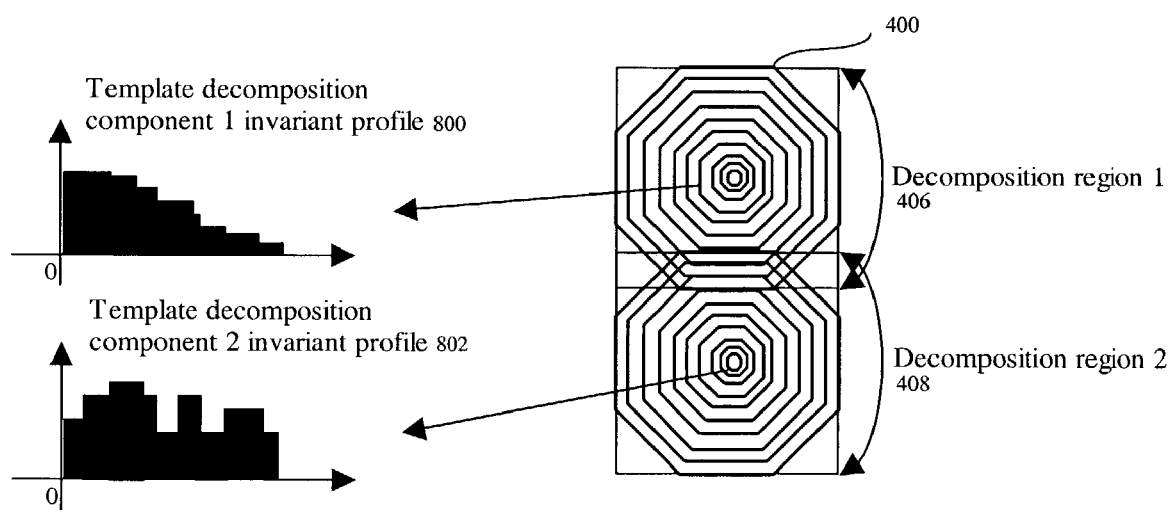
FIG. 8 shows an example of the decomposition component invariant profile generation method.

Once the contour set is determined, the decomposition component invariant profile generation process is performed by placing the contour set at each of the decomposition component regions centered at the component center. The invariant profile can be generated by accumulating the image pixel values along each equal radius contour region. This could be followed by a normalization operation to create a normalized profile. FIG. 8 illustrates this operation by showing the placement of the octagon contour sets on the two decomposition regions 406, 408 from the example of FIG. 4B, 400. The accumulations over the octagon contour sets result in the template decomposition component 1 invariant profile 800 and the template decomposition component 2 invariant profile 802.

The information to be included in the pattern search recipe includes the template decomposition component invariant profiles $profile_0$, $profile_1$, ..., $profile_{N-1}$ and the centers of the components $(x_0, y_0)$, $(x_1, y_1)$, ..., $(x_{N-1}, y_{N-1})$. For scale invariance, the invariant profiles at different scale factors within the search range are stored for each decomposition component.

II.1.2.2 Pattern Decomposition Configuration Generation

This step generates decomposition component weights and allowable partial pattern configurations. The decomposition component weights allow the possibility to selectively emphasize or de-emphasize certain template components in the search result synthesis process. The allowable partial pattern configurations allow the search synthesis process to synthesize results for the allowable partial pattern configurations. This enables a robust pattern search method where valid partial pattern configurations have no match score degradation.

In one embodiment of the invention, the decomposition component weights and the allowable partial pattern configurations can be inputted from users. In another embodiment of the invention, the decomposition component weights and the allowable partial pattern configurations are learned automatically using a set of learning images. The matching score variations of the decomposition components among the learning images are determined. The weights are assigned in inverse proportion to the amount of variation. That is, a component with a higher variation value is given a lower weight.

The allowable partial pattern configurations are constructed to permit the exclusion of components having variations exceeding a threshold.

II.2 Invariant Pattern Search and Synthesis

Figure 9:
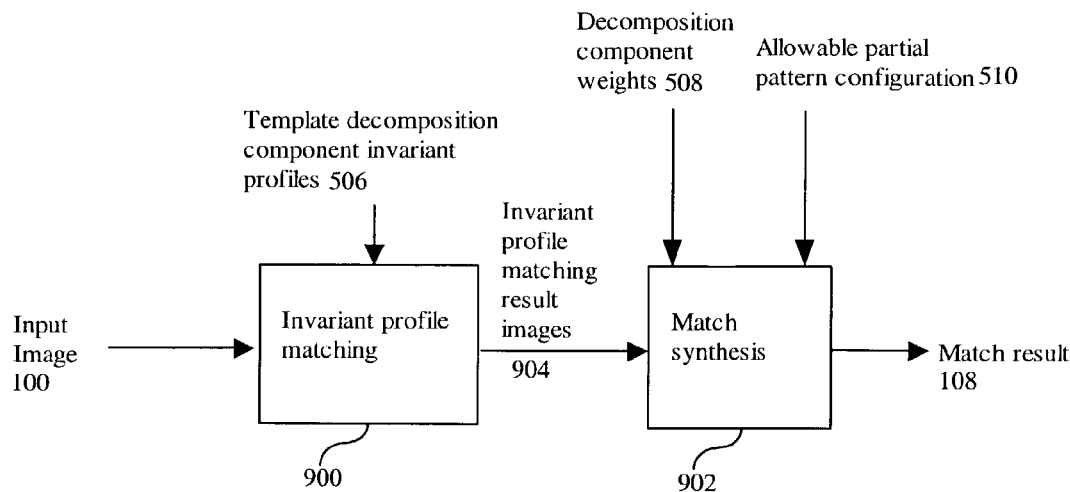
FIG. 9 shows the processing flow for the invariant pattern search and synthesis method.

The invariant pattern search and synthesis method 204 inputs pattern search recipe 202 and the input image 100. It performs an invariant pattern search that results in the match result 108 output. The processing flow of the method is shown in FIG. 9. It includes an invariant profile matching images step 900 and a match synthesis step 902.

As shown in FIG. 9, the input image 100 is subject to an invariant profile matching step 900 where the invariant profiles of the input image are extracted for the decomposition components. The extracted invariant profiles are matched with the template decomposition component invariant profiles 506 of the pattern template contained in the pattern search recipe 202. This results in invariant profile matching result images 904. The invariant profile matching result images 904 are processed by a match synthesis step 902 that synthesizes the match result using decomposition component weights 508 and allowable partial pattern configurations 510 supplied by the pattern search recipe 202. This results in the match result 108.

II.2.1 Invariant Profile Matching

Figure 10:
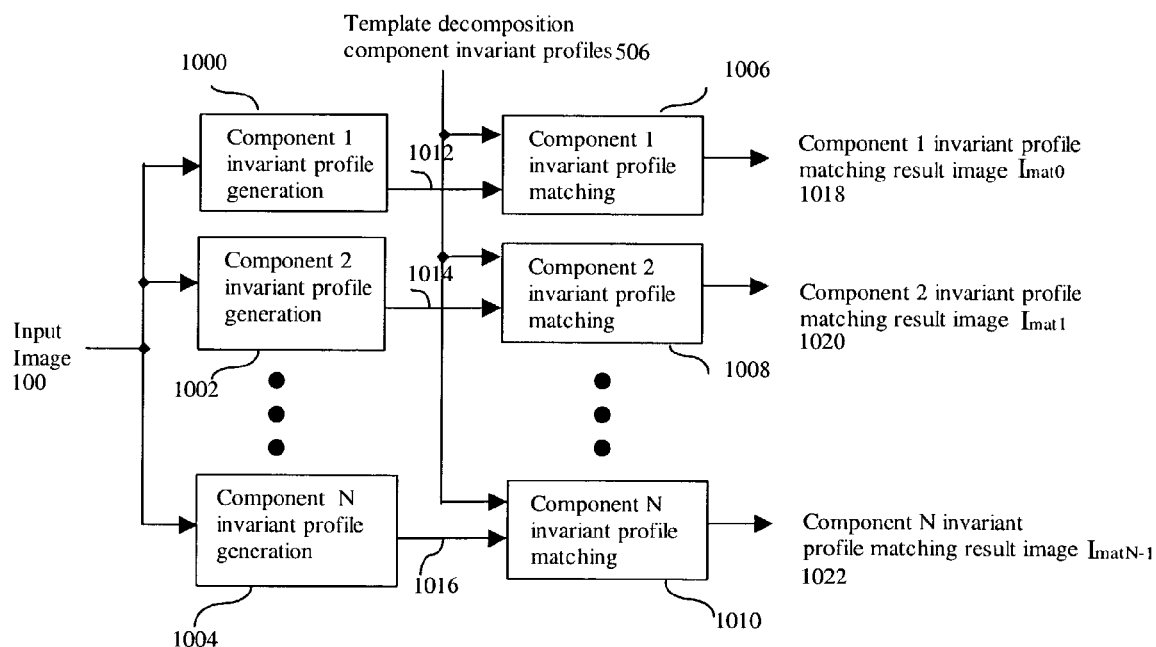
FIG. 10 shows the processing flow for the invariant profile matching method.

The invariant profile matching step consists of a plurality of decomposition component specific invariant profile generation steps and a plurality of decomposition component specific invariant profile matching steps. These steps can be processed in parallel among template decomposition components. The processing flow of the invariant profile matching step is shown in FIG. 10. The input image 100 is subject to the component specific invariant profile generation steps 1000, 1002, ..., 1004, where the component specific invariant profiles 1012, 1014, ..., 1016, are generated using the same contour set geometrical structures as those of their corresponding template invariant profiles. The resulting invariant profiles 1012, 1014, ..., 1016, are fed to the component specific invariant profile matching step 1006, 1008, ..., 1010. This step matches the profiles from the input 1012, 1014, ..., 1016, and the template 506 of each decomposition component and produces matching scores that are stored in component specific invariant profile matching result images, 1018, 1020, ..., 1022. In an alternative embodiment of the invention, the same geometrical structure contour sets are used for all decomposition components. In this case, only one invariant profile generation step is required.

Figure 11:
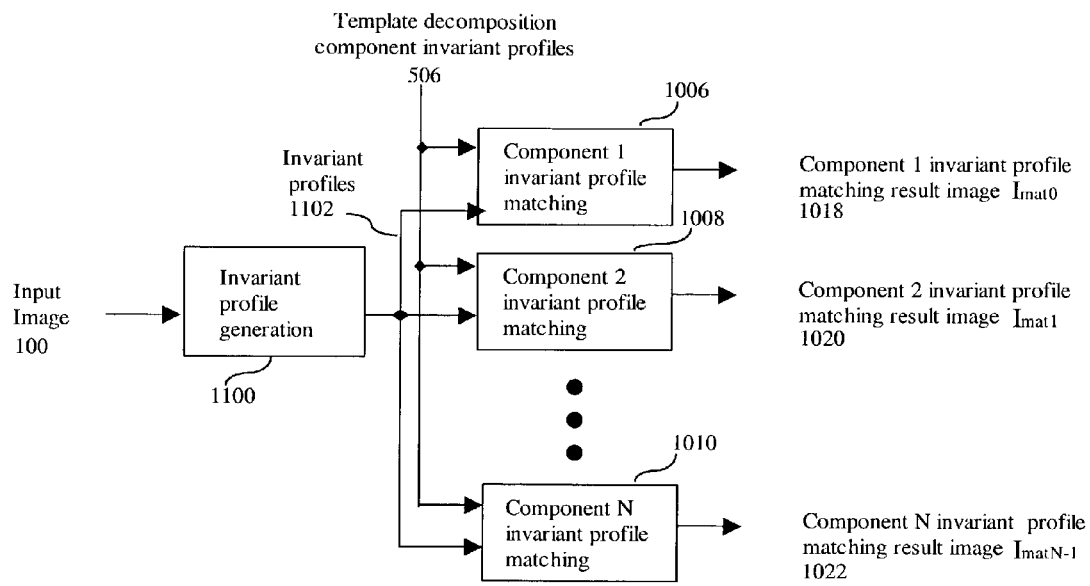
FIG. 11 shows the processing flow for an alternative invariant profile matching method.

FIG. 11 shows the alternative embodiment of the invariant profile matching step. The invariant profiles output 1102 of the single invariant profile generation step 1100 is used to match with each of the template decomposition component invariant profiles 506 by the component specific invariant profile matching step 1006, 1008, . . . , 1010. The resulting matching scores are stored in component specific invariant profile matching result images, 1018, 1020, . . . , 1022. One advantage of this alternative embodiment is the reduction in the amount of processing required.

II.1.3. Component Specific Invariant Profile Matching

The component specific invariant profile matching step matches the invariant profile of a given component to its corresponding template decomposition component invariant profile for each location of the image over a range of search scales of the template decomposition component invariant profiles. The matching score for a given scale template decomposition component invariant profile and the component specific invariant profile of a given location can be calculated using different matching functions such as cross correlation, normalized correlation, normalized covariance function or deviations of these functions. Furthermore, difference between profiles or normalized difference between profiles can also be used. In this case, the result will be converted so that smaller difference yields higher score.

For the scale invariant matching, template decomposition component invariant profiles of different scales are applied and the resulting scale invariant matching score is the maximum matching score over all different scales. This process is repeated for each image location and the results are stored in the component specific invariant profile matching result image. Therefore, each point of an image corresponds to the matching score for a given template component at the best matched scale.

II.2. Match Synthesis

This step synthesizes and determines good complete or partial matches to the template. It also generates the resulting match score and the corresponding rotation angle and magnification scale of the match. To facilitate the match synthesis process, template decomposition components are ordered from the most essential component to the least essential component. In one embodiment of the invention, the order is determined by the decomposition component weights. Higher weight components are ordered first. In the case of equally weighted components, the one most frequently included in the allowable partial pattern configurations is ordered first. The order is arbitrarily assigned in case of a tie.

Figure 12:
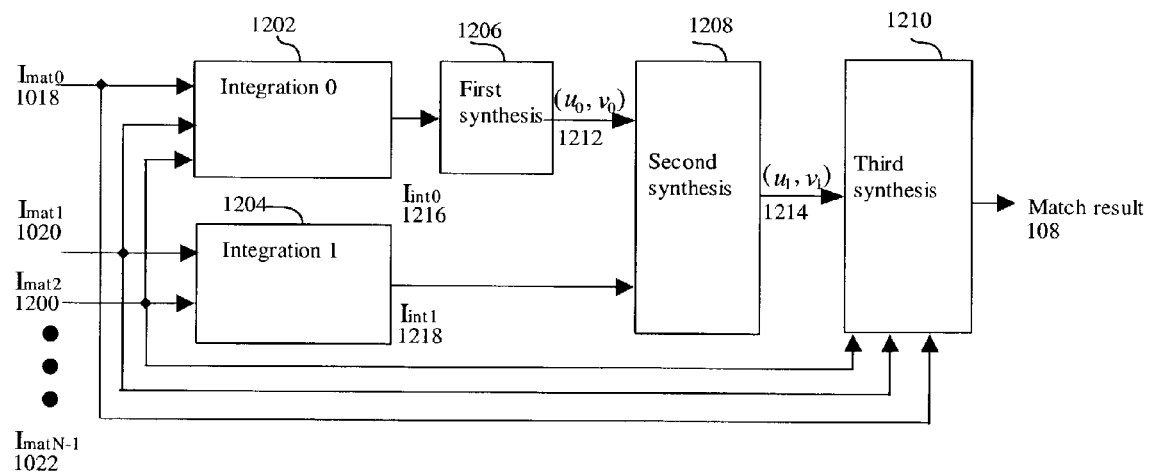
FIG. 12 shows the processing flow for the match synthesis method.

In one embodiment of the invention, the match synthesis step consists of the integration of the matching score result images and multiple synthesis steps as shown in FIG. 12.

FIG. 12 shows the processing flow for the match synthesis step. It contains two integration steps 1202, 1204 of the matching result images 1018, 1020, 1200, . . . , 1022, a first synthesis 1206, a second synthesis 1208 and a third synthesis 1210 step. There are two integration steps of the match scores from the matching result image. The first integration step 1202 (Integration 0) integrates all scores and the second integration step (Integration 1) integrates all but the match score of the $0^{th}$ component stored in the $0^{th}$ matching result images, $I_{mat0}$. The first synthesis 1206 process selects all promising match candidates 1212. The second synthesis process 1208 is performed for each location selected in the first synthesis process to refine the match candidates 1214 and the third synthesis process 1210 is performed for given location, rotation angle, and scale. This results in the match result 108.

II.2.1. Integration Step

In one embodiment of the invention, there are two integration steps. The first integration step 1202 integrates all scores and results in a first integration image $I_{int0}$. The second integration step 1204 integrates all but the match score of the $0^{th}$ component stored in the $0^{th}$ matching result images, $I_{mat0}$. This results in a second integration image $I_{int1}$.

Let the matching result images for component i be $I_{mati}$. In one embodiment of the invention, the first integration image is calculated as follows:

$$I_{int0}=\text{integrate }(w_0*I_{mat0}, w_1*\text{Dilate}01(I_{mat1}), w_2*\text{Dilate}02(I_{mat2}), \ldots ).$$

Where Dilate ij(I) designates the dilation of an image I by a donut shape structuring element and $w_i$ is the weight for component i. If the scale search range is $(s_m, s_M)$, the dilation structuring element is specified as follow:

$$\text{Dilate ij}=\text{Circle}(s_M*d_{ij})-\text{Circle}(s_m*d_{ij}),$$

Where Circle(r) designates a circle region of radius r;

$$d_{ij}=\sqrt{(x_i-x_j)^2+(y_i-y_j)^2};$$

where $(x_i, y_i)$ is the center of the $i^{th}$ component.

The integration( ) function can be the maximum value, the simple summation, or other functions. Its intent is to assign high integrated matching values to possible matching candidates.

Similarly, the second integration image can be calculated as:

$$I_{int1}=\text{integrate}(w_1*I_{mat1}, w_2*\text{Dilate}12(I_{mat2}), \ldots ).$$

Those skilled in the art should recognize that other methods of integration could be used and they are all within the scope of this invention.

II.2.2. The First Synthesis

This step selects all promising match candidates. In one embodiment of the invention, a simple threshold is applied to find the locations having reasonably high $I_{int0}$ value. They are the first synthesis matching locations 1212. These locations are potential matching locations for the center of the $0^{th}$ component.

II.2.3. The Second Synthesis

The second synthesis method is performed for each given location selected by the first synthesis step. For a location $(u_0, v_0)$ 1212 selected by the first synthesis step, the second synthesis step 1208 finds the locations having sufficiently high $I_{int1}$ values within the (u, v) region defined as follows:

$$s_m d_{01}<\sqrt{(u-u_0)^2+(v-v_0)^2}<s_M d_{01}.$$

This is the region containing all possible first component locations $(u_1, v_1)$ given $(u_0, v_0)$ as the center of the first component. This results in the second synthesis matching locations $(u_1, v_1)$ 1214.

II2.4. The Third Synthesis

The third synthesis process is performed for each given location, rotation angle, and scale.

From the first synthesis chosen location $(u_0, v_0)$ 1212 and the second synthesis chosen location $(u_1, v_1)$ 1214, the $k^{th}$ (k=2, 3, . . . ) component center location $(u_k, v_k)$ corresponding to $(x_k, y_k)$ can be calculated by $$u_k=a(x_k-x_0)+b(y_k-y_0)+u_0,$$

$$v_k=-b(x_k-x_0)+a(y_k-y_0)+v_0.$$

Where $$a = \frac{(x_1-x_0)(u_1-u_0)+(y_1-y_0)(v_1-v_0)}{(x_1-x_0)^2+(y_1-y_0)^2}, \text{ and}$$

$$b = \frac{(y_1-y_0)(u_1-u_0)+(x_1-x_0)(v_1-v_0)}{(x_1-x_0)^2+(y_1-y_0)^2}$$

After identifying the centers for all other components, the synthesized matching score for a given location is calculated as follows:

$$i_{intAll} = \text{Integrate}(w_0 * I_{mat0}[u_0]/[v_0], w_1 * I_{mat1}[u_1]/[v_1], w_2 * I_{mat2}[u_2]/[v_2], \ldots).$$

From the synthesized matching score of all selected and synthesized locations, the match candidates are selected. These are the third synthesis matching locations.

After the match candidates are selected, the rotational angle ($\theta$) and the scale ($\alpha$) of each of the third matching locations are determined to be included in the match result 108 output. The scale and cosine and sine values of the rotation angle are determined as follows:

$$\alpha = \frac{\sqrt{(u_1-u_0)^2+(v_1-v_0)^2}}{\sqrt{(x_1-x_0)^2+(y_1-y_0)^2}}$$

$$\cos(\theta) = \frac{1}{D}[(x_1-x_0)(u_1-u_0)+(y_1-y_0)(v_1-v_0)]$$

$$\sin(\theta) = \frac{1}{D}[(x_1-x_0)(v_1-v_0)+(y_1-y_0)(u_1-u_0)].$$

Where $$D = \sqrt{[(x_1-x_0)^2+(y_1-y_0)^2][(u_1-u_0)^2+(v_1-v_0)^2]}$$

Those skilled in the art should recognize that other match synthesis methods could be used and they are all within the scope of this invention. For example, a progressive synthesis method could be used that selects the match candidates from component 0 using only $I_{mat0}$. This is followed by the next step using components 0 and 1 and followed by another step using components 0, 1, and 2. The process continues until all components are used.

II2.5. Partial Pattern Matching

The match synthesis method can be applied for partial pattern matching. To achieve partial pattern matching, each of the allowable partial pattern configurations is considered and the match synthesis method is applied. The match synthesis method for a partial pattern configuration is identical to the regular match synthesis method except that the weights of the excluded components are set to zero. In configurations where component 0 or component one is missing, an alternative component is used to derive component locations and match scale and angles. The processing flow of the partial pattern matching method is shown in FIG. 13.

Figure 13:
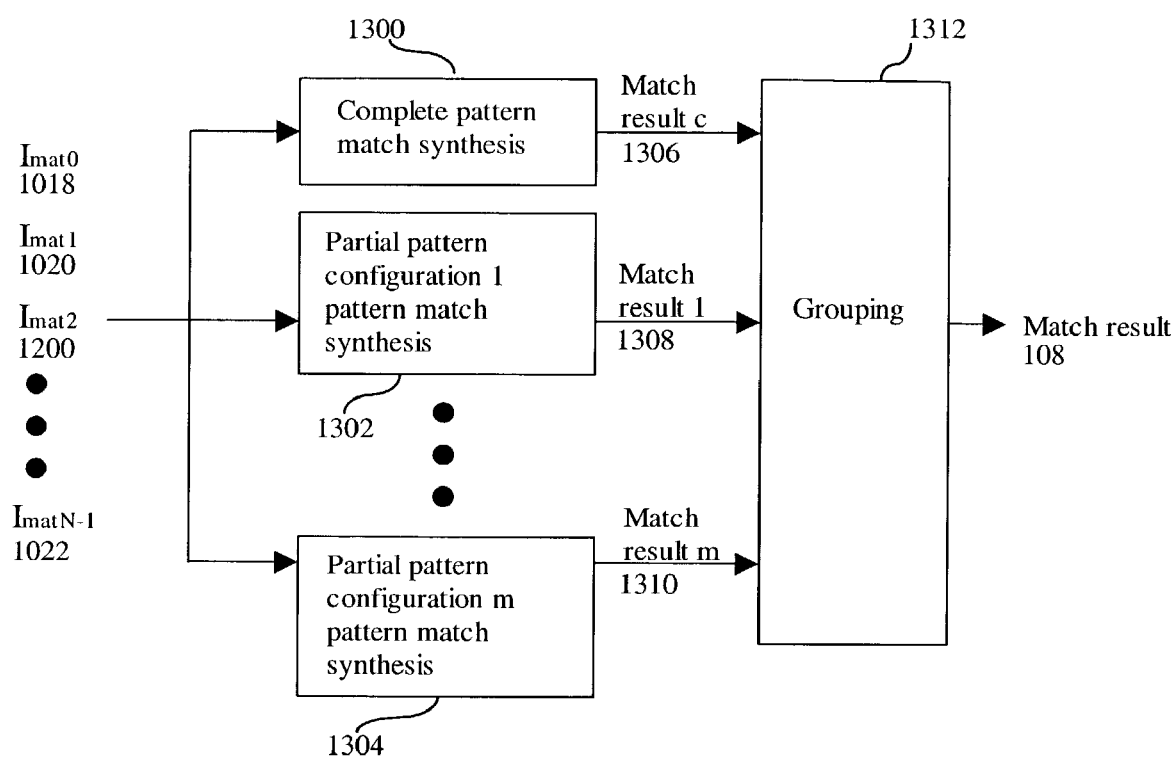
FIG. 13 shows the processing flow for the partial pattern matching method.

As shown in FIG. 13, the matching result images 1018, 1020, ..., 1022, are inputted to the complete pattern match synthesis 1300 and multiple partial pattern configuration specific pattern match synthesis modules 1302, ..., 1304. This results in the complete match result (match result c 1306), the partial pattern configuration specific match results 1308, ..., 1310. These results are grouped 1312 into the overall match result output 108.

III. Refined Invariant Match

After the fast decomposition and synthesis invariant pattern search step, the match result 108 includes match candidates as well as their positions, rotation angles, scales, and partial pattern configuration. The refined invariant match method 104 applies an affine transformation to the pattern template according to the scale, rotation angle, and location contained in the match result. The transformation is calculated as follows:

$$u = \alpha \cos(\theta)(x-x_0) - \alpha \sin(\theta)(y-y_0) + u_0$$

$$v = \alpha \sin(\theta)(x-x_0) + \alpha \cos(\theta)(y-y_0) + u_0$$

After performing transformation on the pattern template, the conventional matching method can be directly applied to obtain the matching score. The refined matches with high matching scores are confirmed to be the refined invariant matches 110. In one embodiment of the invention, the positions, rotation angles and scales of the match candidates are adjusted in small ranges and the refined match is applied to the small ranges around the candidate match result values.

In an alternative embodiment of the invention, the transformation is applied to the input image 100 instead. This method determines the pixel values from the input image corresponding to different (x, y) locations in the pattern template. This can be done by the above transformation. The input image location is designated as (u, v) in the above equation. The pixel values can be derived using the interpolation method or nearest neighbor approach.

Those having ordinary skill in the art should recognize that other image transformation can be used and that are all within the scope of this invention.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices and dimensionality and relations, and that various modifications, both as to the implementation details and detailed procedures, can be accomplished without departing from the scope of the invention itself.

What is claimed is:

1. A fast decomposition and synthesis invariant matching method comprises the steps of:
    a) Input an image;
    b) Input a pattern template;
    c) Perform fast decomposition and synthesis invariant pattern search using the input image and the pattern template to create a match result output;
    d) Perform refined invariant match using the match result and the pattern template to create a refined invariant match result output wherein the refined invariant match includes an affine transformation using the match result values.

2. An invariant pattern search and synthesis method comprises the steps of:
    a) Input an image;
    b) Input a pattern search recipe containing template decomposition component invariant profiles and decomposition component weights and allowable partial pattern configuration;
    c) Perform invariant profile matching using the template decomposition component invariant profiles and the input image to create an invariant profile matching result images output;

d) Perform match synthesis using the invariant profile matching result images and the decomposition component weights and allowable partial pattern configuration to create a match result output wherein the invariant profile matching step further comprises the following steps
    i) Perform invariant profile generation using the input image to create an invariant profiles output;
    ii) Perform at least one component specific invariant profile matching using the invariant profiles and template decomposition component invariant profiles to create at least one component specific invariant profile matching result image output wherein the component specific invariant profile matching step includes matches over different scales.

3. An invariant pattern search and synthesis method comprises the steps of:
  a) Input an image;
  b) Input a pattern search recipe containing template decomposition component invariant profiles and decomposition component weights and allowable partial pattern configuration;
  c) Perform invariant profile matching using the template decomposition component invariant profiles and the input image to create an invariant profile matching result images output;
  d) Perform match synthesis using the invariant profile matching result images and the decomposition component weights and allowable partial pattern configuration to create a match result output wherein the match synthesis step further comprises integration and synthesis steps.

4. The method of claim 3 wherein the integration step further comprises the following steps
  a) Perform an integration 0 using the invariant profile matching result images for all components to create a first integration image output;
  b) Perform an integration 1 using the invariant profile matching result images for all but the $0^{th}$ component to create a second integration image output.

5. The method of claim 3 wherein the synthesis step further comprises
  a) Perform a first synthesis using the first integration image to create a first synthesis matching locations output;
  b) Perform a second synthesis using the first synthesis matching locations to create a second synthesis matching locations output;
  c) Perform a third synthesis using the first synthesis matching locations and the second synthesis matching locations to create a third synthesis matching locations output.

6. The method of claim 5 wherein the third synthesis step determines the rotational angle and the scale of each of the third matching locations.

\* \* \* \* \*